US012609986B2

(12) United States Patent (10) Patent No.: US 12,609,986 B2
Chen et al. (45) Date of Patent: Apr. 21, 2026

(54) METHOD, DEVICE, AND PRODUCT FOR DATA TRANSMISSION

(71) Applicant: DELL PRODUCTS L.P., Round Rock, TX (US)

(72) Inventors: Tao Chen, Beijing (CN); Ran Liu, Beijing (CN); Wensi Zhao, Beijing (CN)

(73) Assignee: DELL PRODUCTS L.P., Round Rock, TX (US)

( * ) Notice: Subject to any disclaimer, the term of this patent is extended or adjusted under 35 U.S.C. 154(b) by 126 days.

(21) Appl. No.: 18/733,602

(22) Filed: Jun. 4, 2024

(65) Prior Publication Data

US 2025/0337809 A1 Oct. 30, 2025

(30) Foreign Application Priority Data

Apr. 26, 2024 (CN) .......................... 202410516849.8

(51) Int. Cl.
*G06F 15/167* (2006.01)
*H04L 47/62* (2022.01)
*H04L 67/1097* (2022.01)

(52) U.S. Cl.
CPC .......... *H04L 67/1097* (2013.01); *H04L 47/62* (2013.01)

(58) Field of Classification Search
CPC ........................... H04L 47/62; H04L 67/1097
See application file for complete search history.

(56) References Cited

U.S. PATENT DOCUMENTS

| | | | |
|---|---|---|---|
| 2002/0184392 A1* | 12/2002 | Parthasarathy | H04L 67/14 709/249 |
| 2013/0198479 A1* | 8/2013 | Jones | G06F 9/3887 711/170 |

* cited by examiner

*Primary Examiner* — Yves Dalencourt
(74) *Attorney, Agent, or Firm* — WOMBLE BOND DICKINSON (US) LLP

(57) ABSTRACT

A method includes acquiring a first allocation request for a channel from a first thread. The method further includes locking a first group of channels for the first thread, where a plurality of channels in the first group of channels correspond to a plurality of remote direct memory access (RDMA) devices, the first thread submits first data to a first RDMA device corresponding to a first channel in the first group of channels, and a first completion channel corresponds to the first channel. The method further includes detecting whether the first data exists in the first completion channel. The method further includes releasing the first group of channels in response to the first data existing in the first completion channel. The method can improve the flexibility and transmission efficiency of data transmission for a scenario of synchronous data transmission.

20 Claims, 5 Drawing Sheets

200

202
Acquiring a first allocation request
for a channel from a first thread

204
Locking a first group of channels
for the first thread

206
Detecting whether first data exists
in a first completion channel

208
Releasing the first group of channels in
response to the first data
existing in the first completion channel

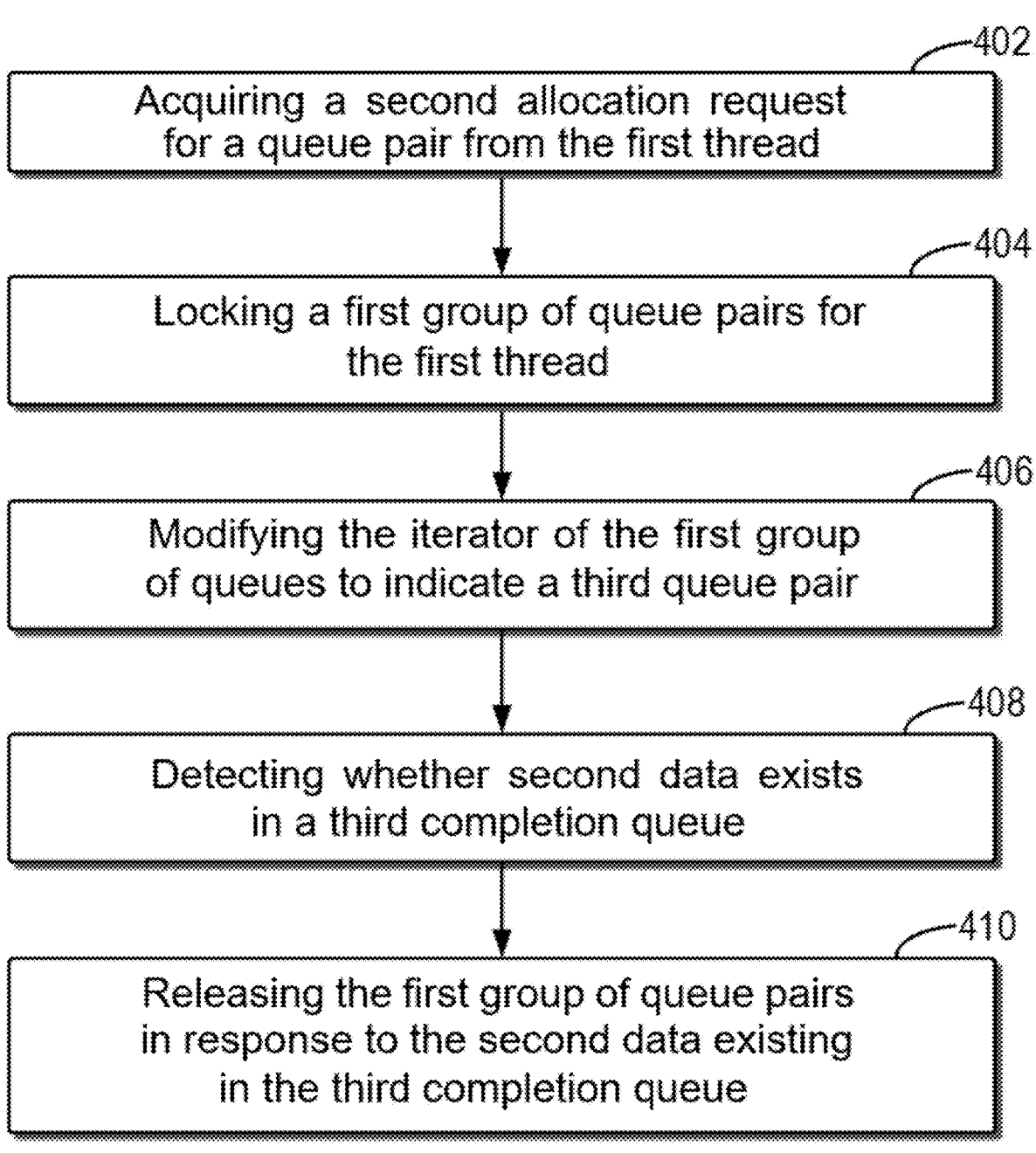

Acquiring a second allocation request for a queue pair from the first thread ⌐402

Locking a first group of queue pairs for the first thread ⌐404

Modifying the iterator of the first group of queues to indicate a third queue pair ⌐406

Detecting whether second data exists in a third completion queue ⌐408

Releasing the first group of queue pairs in response to the second data existing in the third completion queue ⌐410

FIG. 4

METHOD, DEVICE, AND PRODUCT FOR DATA TRANSMISSION

CROSS-REFERENCE TO RELATED APPLICATION

This patent application claims priority, under 35 U.S.C. § 119, of Chinese Patent Application No. 202410516849.8, filed Apr. 26, 2024, which is incorporated by reference in its entirety.

TECHNICAL FIELD

The present disclosure relates to the field of computers, and more particularly relates to a method, device, and computer program product for data transmission.

BACKGROUND

Generally, network communication modes involve a large number of system context switches and data copies between user space and kernel space during data transmission, thereby resulting in a relatively high latency and CPU load. In contrast, Remote Direct Memory Access (RDMA) technology allows user programs to bypass an operating system kernel and directly interact with a network card for network communication, thereby significantly improving data transmission efficiency and reducing latency.

Queue Pairs (QPs) play an important role in RDMA technology. Each QP consists of a transmission queue and a receiving queue, which are jointly responsible for data transmission and receiving. The use of QP enables RDMA communication to perform data transmission directly between memories without the intervention of an operating system.

SUMMARY OF THE INVENTION

Embodiments of the present disclosure provide a method, device, and computer program product for data transmission. In a first aspect of the embodiments of the present disclosure, a method for data transmission is provided. The method includes acquiring a first allocation request for a channel from a first thread. The method further includes locking a first group of channels for the first thread, where a plurality of channels in the first group of channels correspond to a plurality of remote direct memory access (RDMA) devices, the first thread submits first data to a first RDMA device corresponding to a first channel in the first group of channels, and a first completion channel corresponds to the first channel. The method further includes detecting whether the first data exists in the first completion channel. The method further includes releasing the first group of channels in response to the first data existing in the first completion channel.

In a second aspect of the embodiments of the present disclosure, an electronic device is provided. The electronic device includes one or more processors; and a storage apparatus configured to store one or more programs, where the one or more programs, when executed by one or more processors, cause the one or more processors to execute actions. These actions include acquiring a first allocation request for a channel from a first thread. These actions further include locking a first group of channels for the first thread, where a plurality of channels in the first group of channels correspond to a plurality of remote direct memory access (RDMA) devices, the first thread submits first data to a first RDMA device corresponding to a first channel in the first group of channels, and a first completion channel corresponds to the first channel. These actions further include detecting whether the first data exists in the first completion channel. These actions further include releasing the first group of channels in response to the first data existing in the first completion channel.

In a third aspect of the embodiments of the present disclosure, a computer program product is provided. The computer program product is tangibly stored on a non-volatile computer-readable medium and includes machine-executable instructions. The machine-executable instructions, when executed, cause a machine to execute actions. These actions include acquiring a first allocation request for a channel from a first thread. These actions further include locking a first group of channels for the first thread, where a plurality of channels in the first group of channels correspond to a plurality of remote direct memory access (RDMA) devices, the first thread submits first data to a first RDMA device corresponding to a first channel in the first group of channels, and a first completion channel corresponds to the first channel. These actions further include detecting whether the first data exists in the first completion channel. These actions further include releasing the first group of channels in response to the first data existing in the first completion channel.

It should be understood that the content described in the Summary of the Invention part is neither intended to identify key or important features of the embodiments of the present disclosure, nor intended to limit the scope of the present disclosure. Other features of the present disclosure will become readily understood with reference to the following description.

DESCRIPTION OF DRAWINGS

In conjunction with the drawings and with reference to the detailed description below, the above and other features, advantages, and aspects of embodiments of the present disclosure will become more apparent. Identical or similar reference numerals in the drawings represent identical or similar elements, in which:

FIG. 4 is a schematic diagram of data transmission according to an embodiment of the present disclosure.

DETAILED DESCRIPTION

Figure 1:
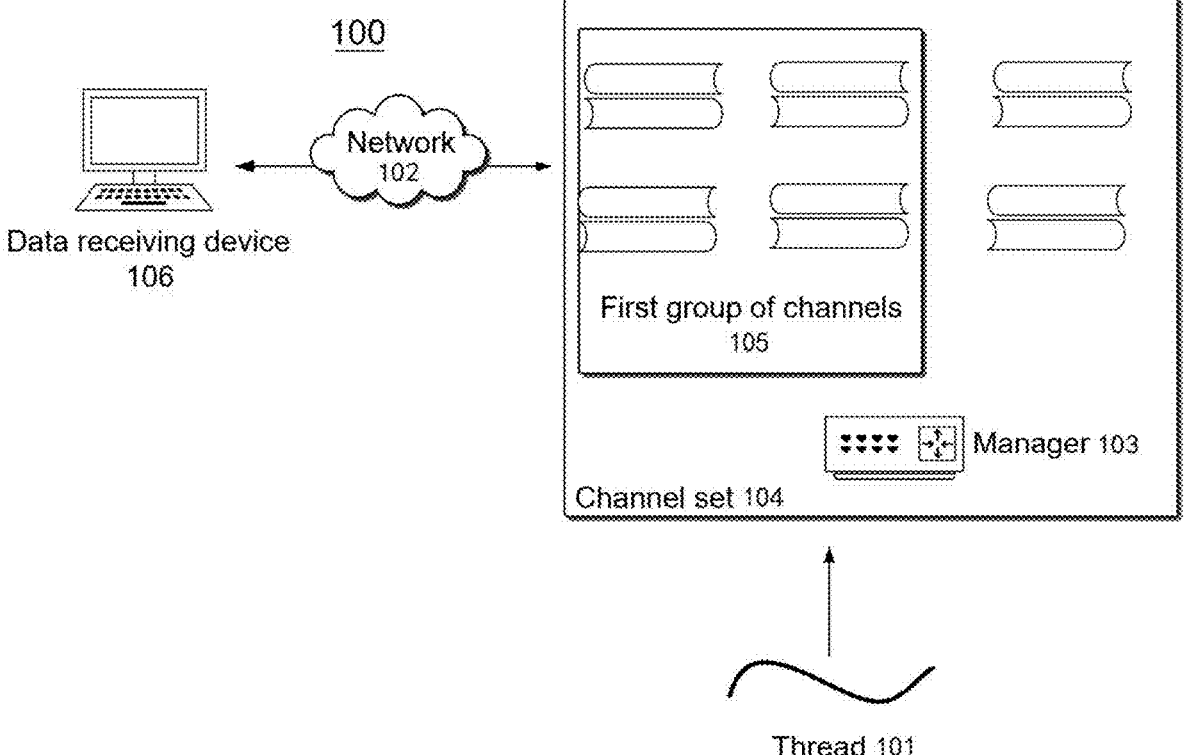
FIG. 1 is a schematic diagram of an example environment in which an embodiment of the present disclosure may be implemented.

Embodiments of the present disclosure will be described in more detail below with reference to the drawings. While some embodiments of the present disclosure are shown in the drawings, it should be understood that the present disclosure may be implemented in various forms and should not be construed as being limited to the embodiments set forth herein. On the contrary, these embodiments are provided to more thoroughly and completely understand the present disclosure. It should be understood that the drawings and embodiments of the present disclosure are only used as examples, and are not intended to limit the scope of protection of the present disclosure.

In the description of the embodiments of the present disclosure, the term "including" and similar wordings thereof should be construed as open-ended inclusions, i.e., "including but not limited to." The term "based on" should be construed as "at least partially based on." The term "an embodiment" or "the embodiment" should be construed as "at least one embodiment." The terms "first," "second," and the like may refer to different or identical objects. Other explicit and implicit definitions may be further included below.

In the related art, each time when starting to submit data to an RDMA device, a thread for synchronous data transmission will lock the queue pair corresponding to the RDMA device. The thread needs to ensure that not only is the data submitted to the RDMA device, but also it can leave the RDMA device and end this round of data transmission only after the RDMA device successfully transmits the submitted data. This locking mechanism ensures the consistency and security of data transmission. In an RDMA-based communication process, a transmission device and a receiving device both maintain their own queue pairs and transmit data through these queue pairs. This locking mechanism ensures the atomicity of data transmission, that is, the data transmission process will not be interrupted by other operations. However, this locking operation is very time-consuming and consumes computing resources. How to improve the data transmission efficiency is a problem urgently needing to be solved.

To this end, the present disclosure presents a method for data transmission. The method in an embodiment of the present disclosure includes acquiring a first allocation request for a channel from a first thread. The method further includes locking a first group of channels for the first thread, where a plurality of channels in the first group of channels correspond to a plurality of remote direct memory access (RDMA) devices, the first thread submits first data to a first RDMA device corresponding to a first channel in the first group of channels, and a first completion channel corresponds to the first channel. The method further includes detecting whether the first data exists in the first completion channel. The method further includes releasing the first group of channels in response to the first data existing in the first completion channel. Therefore, in a scenario of synchronous data transmission, the first group of channels is locked for a thread that needs to transmit data each time, so that the thread for synchronous data transmission can switch to another channel to transmit data without an unlocking operation and a locking operation. Therefore, the method of the present disclosure can be used to improve the flexibility and efficiency of data transmission.

FIG. 1 is a schematic diagram of an example environment 100 in which an embodiment of the present disclosure may be implemented. As shown in FIG. 1, the environment 100 may include a thread 101, a network 102, a manager 103, a channel set 104, a first group of channels 105, and a data receiving device 106. The channel set 104 is communicatively coupled to the data receiving device 106 through the network 102. The network 102 may be, for example, a wide area network (WAN), a local area network (LAN), a wireless network, a public telephone network, an intranet, and any other type of network known to those skilled in the art.

In this embodiment, the method for data transmission is mainly executed by the manager 103. The manager 103 may be, for example, a control that controls the channel set 104 and is configured to perform resource management on the channel set 104. The manager 103 may apply this embodiment, for example, in a process of mirroring storage data. In this embodiment, the method executed by the manager 103 includes the following steps. The manager 103 acquires a first allocation request for a channel from a first thread (hereinafter referred to as "thread") 101. RDMA technology provides an ability to directly access a remote memory. When the thread needs to transmit data, the thread of the sender is allowed to write the data directly into the memory of the receiver. This operation is completed directly at the hardware level, bypassing the intervention of the kernel and CPU of an operating system. In order to utilize the channel set 104, the thread 101 may first communicate with the manager 103 for control, to request channel allocation.

The manager 103 locks a first group of channels 105 for the thread 101, where the plurality of channels in the first group of channels 105 correspond to a plurality of remote direct memory access (RDMA) devices, and the thread 101 submits first data to a first RDMA device corresponding to the first channel in the first group of channels, and a first completion channel corresponds to the first channel. Each RDMA device among the plurality of RDMA devices corresponding to the channel set 104 may be provided with several channels respectively for transmitting data. The first group of channels 105 may correspond to a plurality of RDMA devices. In some embodiments, the first group of channels 105 corresponds to four RDMA devices, and the first group of channels 105 includes four channels corresponding to the four RDMA devices respectively. In this way, once an RDMA device fails, the thread 101 can flexibly switch to another RDMA device (that is, an RDMA device corresponding to another channel in the first group of channels 105) to transmit data without repeatedly unlocking and locking, which can improve data transmission efficiency and flexibility.

The manager 103 detects whether the first data exists in the first completion channel. In the case where the first completion channel is a first completion queue, for each piece of successfully transmitted data, a corresponding completion queue entity will exist in the first completion queue. The first completion queue reads data based on a first-in first-out principle. The manager 103 can detect whether the first data is successfully transmitted by reading the completion queue entity in the first completion queue. The process of reading the completion queue entity is asynchronous, that is, the RDMA device can continue to perform other tasks before the detection is completed. In this operation, the manager 103 can access the first channel in the first group of channels 105, and then poll the first completion channel corresponding to the first channel.

The manager 103 releases the first group of channels 105 in response to the first data existing in the first completion channel. If the first data exists in the first completion channel, it means that the first data has been transmitted, the data transmission task of the thread 101 has been completed, and it is not necessary to continue locking the first group of channels 105. Therefore, the first group of channels 105 can be released.

As shown in FIG. 1, in the environment 100, the network 102 may be used to transmit data between the channel set 104 and the data receiving device 106. The network 102 has a theoretical bandwidth. The theoretical bandwidth refers to the maximum transmission speed supported by the network 102, represents the largest data volume that can be transmitted by the network 102 under ideal conditions, and is usually measured in bits per second (bps). For example, if the theoretical bandwidth of the network 102 is 100 Mbps, it means that the network can transmit one hundred megabits of data per second under ideal conditions. However, in practice, because other factors (such as signal interference, bandwidth sharing, and transmission delay) may exist in the network, it may not be possible to achieve an actual transmission speed of 100 Mbps.

It is understood by those of ordinary skill in the art that the manager 103 can be integrated into an RDMA device set corresponding to the channel set 104 and use the processor of the RDMA device without using the processor of other devices, thereby achieving data transmission without consuming the computing resources of other devices, for example, achieving mirroring storage of data.

Figure 2:
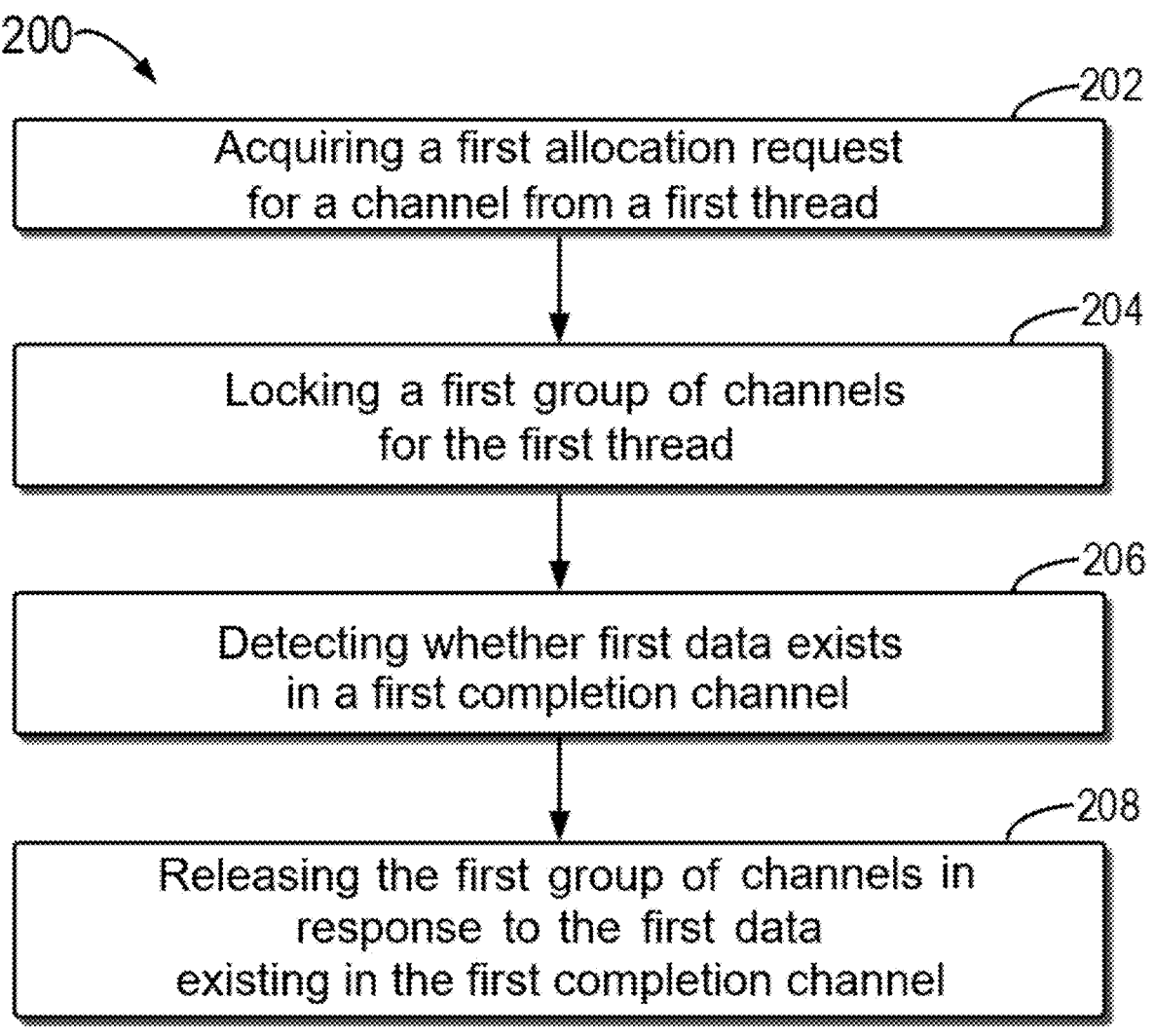
FIG. 2 is a flow chart of a method for data transmission according to some embodiments of the present disclosure.

FIG. 2 is a flow chart of a method for data transmission according to some embodiments of the present disclosure. As shown in FIG. 2, the flow chart 200 includes blocks 202-208. At block 202, a first allocation request for a channel is acquired from a first thread. In this operation, the thread does not need to indicate information such as an identifier of a to-be-used RDMA device in the first allocation request as required in the related art, but only needs to inform, for example, the manager that the thread needs to transmit data through a channel.

At block 204, a first group of channels is locked for the first thread, where a plurality of channels in the first group of channels correspond to a plurality of remote direct memory access (RDMA) devices, the first thread submits first data to a first RDMA device corresponding to a first channel in the first group of channels, and a first completion channel corresponds to the first channel. This group of channels includes a plurality of channels corresponding to different RDMA devices. The locking operation ensures that the thread exclusively occupies these channels during data transmission, thereby avoiding competition for these channels with other threads, and ensuring the stability and reliability of data transmission. After the channels are locked, the thread selects the first channel as a channel for data transmission, and submits the first data to the first RDMA device corresponding to the first channel in the first group of channels, instead of submitting the first data to all channels or some channels that are locked. The first data here may be any type of data packet, such as a file, a video stream, or a database record. Through the RDMA devices, data can be directly transmitted from the memory of the sender to the memory of the receiver without being processed by an operating system, thus greatly improving data transmission efficiency.

At block 206, whether the first data exists in the first completion channel is detected. In some embodiments, the first completion channel is a first completion queue, and the first completion queue is provided with a first-in first-out data structure. Whether the first data has been successfully transmitted can be detected by reading the completion queue entity in the first completion queue. The process of reading the completion queue entity is asynchronous, that is, the RDMA device can continue to perform other tasks before the detection is completed.

At block 208, the first group of channels is released in response to the first data existing in the first completion channel. Once it is detected that completion information related to the first data exists in the first completion channel, it is known that the first data has been successfully transmitted. In this case, a release operation can be triggered to release the previously locked first group of channels back to the channel resource pool, so that other threads can reapply for and use these channels.

Therefore, in a scenario of synchronous data transmission, the first group of channels is locked for a thread that needs to transmit data each time, so that the thread for synchronous data transmission can switch to another channel to transmit data without an unlocking operation and a locking operation. Therefore, the method of the present disclosure can be used to improve the flexibility and efficiency of data transmission.

The present disclosure is based on RDMA technology, the first group of channels may be a first group of queue pairs (QP), and the first group of queue pairs may include a plurality of queue pairs. In some embodiments, the first group of queue pairs is provided with an iterator. In this embodiment, assuming that the iterator currently indicates a first queue pair, when the first queue pair fails, the iterator of the first group of queues is modified to indicate a second queue pair in the first group of queues, where the second queue pair is different from the first queue pair. Further, the thread submits the first data to a second RDMA device corresponding to the second queue pair. In the case where the first group of queue pairs includes four queue pairs, the iterator can be incremented by 1 in each iteration, and goes back to 1 when it reaches 4 and re-iteration is required.

The embodiment provides a processing solution when an employed queue pair fails. By setting the iterator, it is possible to automatically change queue pairs in the locked first group of queue pairs. The thread neither needs to repeatedly request to lock the queue pair beyond the first group of queue pairs, nor needs to present any allocation request in the first group of queue pairs, thereby improving data transmission efficiency and flexibility.

In some embodiments, for any allocated group of queue pairs, the RDMA devices corresponding to the queue pairs are different from each other. This is very helpful for the thread. Because sometimes failure of a queue pair is caused by failure of a corresponding RDMA device, all queue pairs set for the RDMA device are faulty. However, the thread and the manager cannot recognize this situation without other help, so if the same faulty RDMA device is randomly allocated to the thread, the thread still fails to transmit data. In the related art, there is neither a locked channel group nor a limitation that each channel in the channel group corresponds to a different RDMA device. When an RDMA device fails, repeated locking and unlocking may occur for many threads, thereby greatly wasting computing resources. In this embodiment, each queue pair is restricted to a different RDMA device from each other, so that when the thread uses an iterator to automatically switch queue pairs in the first group of queue pairs, the thread can directly switch to another RDMA device without repeatedly switching queue pairs many times.

Figure 3:
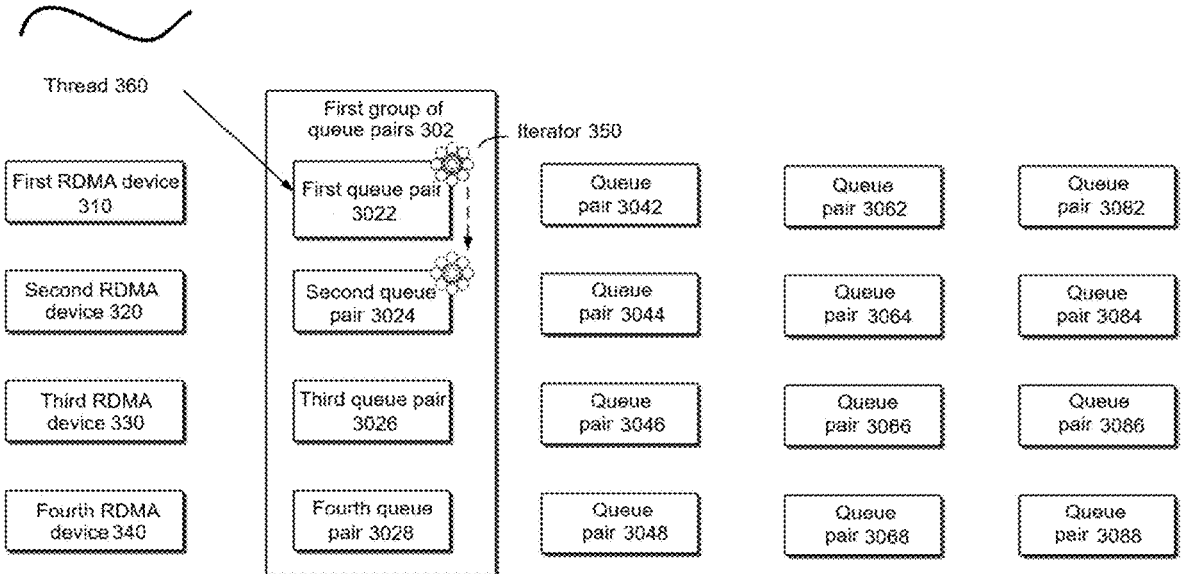
FIG. 3 is a schematic diagram of queue pair switching according to an embodiment of the present disclosure.

FIG. 3 is a schematic diagram of queue pair switching according to an embodiment of the present disclosure. An iterator 350 is shown. A first group of queue pairs 302 includes four queue pairs, namely, a first queue pair 3022, a second queue pair 3024, a third queue pair 3026, and a fourth queue pair 3028. The queue pairs 3022, 3024, 3026, and 3028 correspond to a first RDMA device 310; queue pairs 3042, 3044, 3046, and 3048 correspond to a second RDMA device 320; queue pairs 3062, 3064, 3066, and 3068 correspond to a third RDMA device 330; and queue pairs 3082, 3084, 3086, and 3088 correspond to a fourth RDMA device 340. Similarly, a second group of queue pairs 304 includes four queue pairs, namely, a first queue pair 3042, a second queue pair 3044, a third queue pair 3046, and a fourth queue pair 3048. The rest will not be repeated.

A thread 360 currently can submit data (i.e., first data) to the first queue pair 3022 in the locked first group of queue pairs 302, and the value of the iterator 350 is 1. In the process of data transmission, if the first RDMA device 310 fails, the iterator 350 is automatically incremented by 1 and becomes 2, that is, moving to 3024 as indicated by the dotted arrow. The thread 360 submits data to the second queue pair 3024.

In some embodiments, the first completion channel is a first completion queue corresponding to the first queue pair, the first thread is provided with a first list, and the first list indicates the transmission state of each piece of data among the first data. After detecting whether the first data exists in the first completion channel, this embodiment further includes updating, in case of the first portion of data among the first data existing in the first completion queue, the first list to indicate successful transmission of the first portion of data, where the first portion of data includes at least one piece of data. Further, the thread submits data other than the first portion data among the first data to the second RDMA device based on the first list. In this embodiment, whether the transmission of each piece of data is successful or not is known by setting a list for monitoring transmission states. In this way, if a queue pair is switched, it is not necessary to re-transmit all the data, but only a portion of data is transmitted, which can improve data transmission efficiency.

FIG. 4 is a schematic diagram of data transmission according to an embodiment of the present disclosure. In this embodiment, an iterator currently indicates a first queue pair. At block 402, a second allocation request for a queue pair is acquired from the first thread. That is, the manager receives an allocation request from the thread again. At block 404, a first group of queue pairs is locked for the first thread. Generally, the manager may lock any one group of queue pairs for the first thread. This embodiment involves processing when the locked queue pairs are the first group of queue pairs again.

At block 406, the iterator of the first group of queues is modified to indicate a third queue pair, where the third queue pair is different from the first queue pair, the first thread submits second data to a third RDMA device corresponding to the third queue pair, and a third completion queue corresponds to the third queue pair. That is to say, when the thread re-requests allocation of a channel, the same group of channels can be locked, but the specific allocated channel needs to be changed. At block 408, whether the second data exists in a third completion queue is detected. Because this thread is a synchronization thread and needs to ensure that the second data is all transmitted before the lock can be ended, it is still necessary to detect whether third data exists in the completion queue. At block 410, the first group of queue pairs is released in response to the second data existing in the third completion queue. In this case, the task of the thread has been completed, and this group of queue pairs can be allocated to other threads, so that the first group of queue pairs can be released.

In this embodiment, each time the thread requests allocation of a queue pair, if the allocated group of queue pairs is the same group of queue pairs as before, the queue pair ultimately used to transmit data will be automatically switched once. This enables the workload to be shared equally among the queue pairs in the group of queue pairs and balances the load of each RDMA device, which can improve the work efficiency of the RDMA device group.

Similarly, in some embodiments, an allocation request for a queue pair is acquired from another thread (i.e., a "second thread"). The first group of queue pairs can be locked for the other thread as well. However, the iterator of the first group of queues needs to be modified to indicate a fourth queue pair, where the fourth queue pair is different from the first queue pair and may be the same as or different from the second and third queue pairs. This embodiment further includes submitting, by the other thread, the third data to a fourth RDMA device corresponding to the fourth queue pair, and a fourth completion queue corresponds to the fourth queue pair. Whether the third data exists in the fourth completion queue is detected. This embodiment further includes releasing the first group of queue pairs in response to the fourth RDMA device having transmitted the third data. In this embodiment, when different threads request the same group of queue pairs, through the control of the iterator, the workload is shared equally among the queue pairs in the group of queue pairs, which can improve the work efficiency of the RDMA device group.

The present disclosure further provides an embodiment for detecting whether an RDMA device has transmitted data. In some embodiments, the first channel is a first queue pair, the first queue pair includes a transmission queue, and the first completion channel is a first completion queue corresponding to the first queue pair. This embodiment first detects whether the first data exists in the transmission queue. If the first data exists in the transmission queue, it is determined that the RDMA device corresponding to the first queue pair has received the first data, that is, the thread has submitted the first data to the RDMA device, but the RDMA device has not transmitted the first data yet. If the first data does not exist in the transmission queue, whether a completion queue entity for the first data exists in the first completion queue is detected. If a completion queue entity for the first data exists in the first completion queue, it is determined that the first RDMA device has transmitted the first data. This embodiment can provide a specific solution for detecting data transmission states, which can improve data monitoring accuracy.

In order to ensure the validity of the transmitted data, in some embodiments, the transmission state of transmission data in the transmission queue is first detected. If the transmission of the transmission data in the transmission queue fails, the transmission data is re-transmitted. Due to network failure or other reasons, sometimes the data transmission will be interfered with, and re-transmission can be used to ensure that the receiver receives complete and sequential data. If the transmission data is successfully transmitted, a completion queue entity for the transmission data is constructed in the first completion queue. In this embodiment, the construction of each completion queue entity means successful transmission of a piece of data, which can improve transmission efficiency.

Accordingly, the present disclosure further provides a specific solution for detecting data transmission states. In some embodiments, in order to detect the data transmission status, completion queues may be accessed, and a completion queue entity for each piece of data among the first data may be retrieved from the completion queues. If the completion queue entity for each piece of data is retrieved, it is determined that the first data has been transmitted. Further, the completion queue entity for each piece of data is eliminated from the first completion queue. In this embodiment, each completion queue entity can be read once without repeated reading, which achieves high processing efficiency. In some embodiments, if the completion queue entity for each piece of data is not retrieved, the retrieval is performed repeatedly in the first completion queue. This can monitor whether all data is successfully transmitted.

Figure 5:
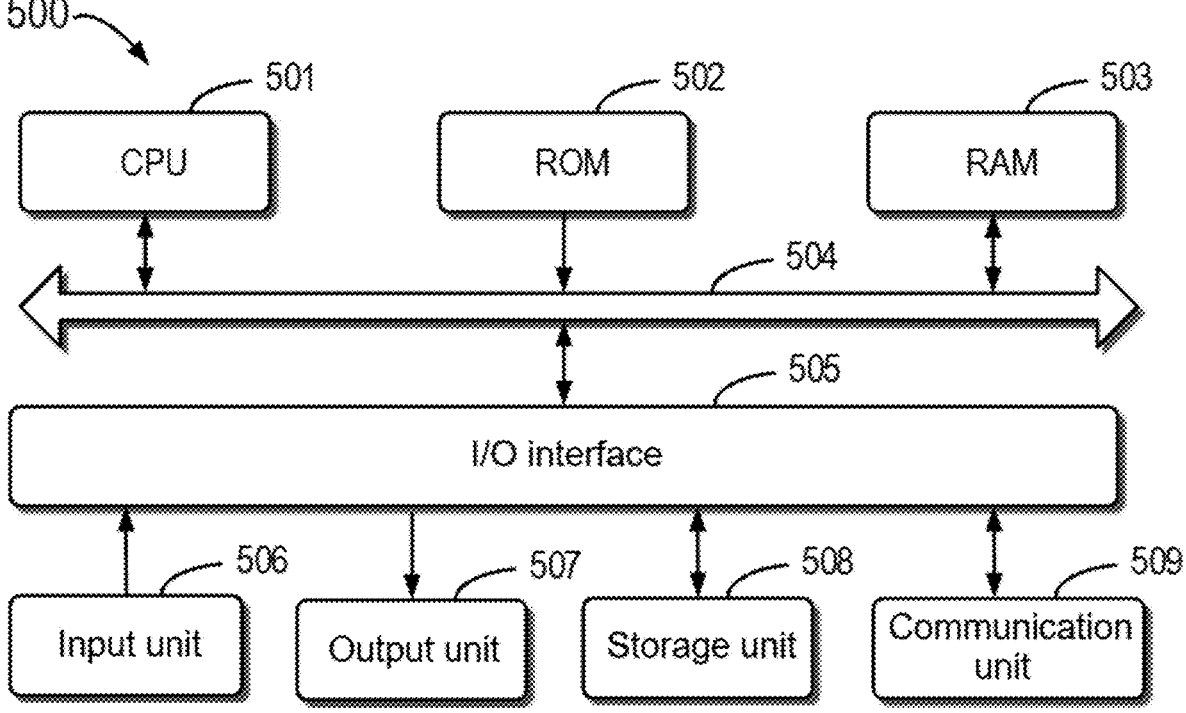
FIG. 5 is a schematic block diagram of an example device that can be configured to implement embodiments of the present disclosure.

FIG. 5 is a schematic block diagram of an example device 500 that can be configured to implement embodiments of the present disclosure. As shown in the figure, the device 500 includes a computing unit 501, which may execute various appropriate actions and processes in accordance with computer program instructions stored in a read-only memory (ROM) 502 or computer program instructions loaded into a random access memory (RAM) 503 from a storage unit 508. The RAM 503 may further store various programs and data required by operations of device 500. The computing unit 501, the ROM 502, and the RAM 503 are connected to each other through a bus 504. An input/output (I/O) interface 505 is also connected to the bus 504.

A number of components in the device 500 are connected to the I/O interface 505, including: an input unit 506, such as a keyboard or a mouse; an output unit 507, such as various types of displays or speakers; the storage unit 508, such as a magnetic disk or an optical disk; and a communication unit 509, such as a network card, a modem, or a wireless communication transceiver. The communication unit 509 allows the device 500 to exchange information/data with other devices via a computer network such as the Internet and/or various telecommunication networks.

The computing unit 501 may be various general-purpose and/or special-purpose processing components having a processing power and a computing power. Some examples of the computing unit 501 include, but are not limited to, a central processing unit (CPU), a graphics processing unit (GPU), various special-purpose artificial intelligence (AI) computing chips, various computing units running a machine learning model algorithm, a digital signal processor (DSP), and any appropriate processor, controller, micro-controller, and the like. The computing unit 501 executes various methods and processes described above, such as the method 200. For example, in some embodiments, the method 200 may be implemented as a computer software program that is tangibly included in a machine-readable medium such as the storage unit 508. In some embodiments, some or all of the computer programs may be loaded and/or installed onto the device 500 via the ROM 502 and/or the communication unit 509. When the computer program is loaded into the RAM 503 and executed by the computing unit 501, one or more steps of the method 200 described above may be executed. Alternatively, in other embodiments, the computing unit 501 may be configured to execute the method 200 by any other appropriate approach (e.g., by means of firmware).

The functions described above may at least partially be executed by one or more hardware logic components. For example, non-restrictively, example types of usable hardware logic components include: a field programmable gate array (FPGA), an application specific integrated circuit (ASIC), an application specific standard product (ASSP), a system-on-chip system (SOC), a loading programmable logic device (CPLD), and so on.

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, partially executed as a separate software package on a machine and partially executed on a remote machine, or completely executed on a remote machine or server.

In the context of the present disclosure, the machine-readable medium may be a tangible medium which may contain or store a program for use by, or use in combination with, an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. Further, while the operations are depicted in a particular order, it should be understood that the operations are required to be executed in the shown particular order or in a sequential order, or that all illustrated operations are required to be executed to achieve desired results. In certain environments, multitasking and parallel processing may be advantageous. Similarly, while a number of specific implementation details are included in the above description, these implementation details should not be construed as limiting the scope of the present disclosure. Some features described in the context of separate embodiments may also be implemented in combination in a single implementation. On the contrary, various features described in the context of a single implementation may also be implemented in a plurality of implementations separately or in any appropriate sub-combination.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operations of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partially on a user computer, as a stand-alone software package, partially on a user computer and partially on a remote computer, or entirely on a remote computer or a server. In the case where a remote computer is involved, the remote computer can be connected to a user computer through any kind of network, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product implemented according to the embodiments of the present disclosure. It should be understood that each block of the flow charts and/or the block diagrams and a combination of blocks in the flow charts and/or the block diagrams may be implemented by computer-readable program instructions.

The computer-readable program instructions may be provided to the processing unit of a general-purpose computer, a special-purpose computer, or other programmable data processing apparatuses to produce a machine, such that the instructions, when executed by the processing unit of the computer or the other programmable data processing apparatuses, generate an apparatus implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a particular manner; and thus, the computer-readable medium storing instructions includes an article of manufacture that includes instructions implementing various aspects of the functions/actions specified in one or more blocks in the flow charts and/or block diagrams.

The computer-readable program instructions may also be loaded onto a computer, other programmable data processing apparatuses, or other devices, such that a series of operations or steps may be executed on the computer, the other programmable data processing apparatuses, or the other devices to produce a computer-implemented process, and such that the instructions executed on the computer, the other programmable data processing apparatuses, or the other devices may implement the functions/actions specified in one or more blocks in the flow charts and/or block diagrams.

The flow charts and block diagrams in the figures show the architectures, functions, and operations of possible implementations of the systems, methods, and computer program products according to various embodiments of the present disclosure. In this regard, each block in the flow charts or block diagrams may represent a module, a program segment, or a portion of an instruction, the module, the program segment, or the portion of the instruction including one or more executable instructions for implementing specified logical functions. In some alternative implementations, functions annotated in the blocks may also occur in a sequence different from the sequence annotated in the figures. For example, two successive blocks may actually be executed substantially in parallel, and sometimes they may also be executed in a reverse order, which depends on the involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated embodiments. The selection of the terms used herein is intended to best explain the principles and practical applications of the embodiments or the improvements to technologies on the market, or to enable other persons of ordinary skill in the art to understand the embodiments disclosed herein.

The invention claimed is:

1. A method for data transmission, comprising:
acquiring a first allocation request for a channel from a first thread;
locking a first group of channels for the first thread, wherein a plurality of channels in the first group of channels correspond to a plurality of remote direct memory access (RDMA) devices, the first thread submits first data to a first RDMA device corresponding to a first channel in the first group of channels, and a first completion channel corresponds to the first channel;
detecting whether the first data exists in the first completion channel; and
releasing the first group of channels in response to the first data existing in the first completion channel.

2. The method according to claim 1, wherein the first group of channels is a first group of queue pairs, the first group of queue pairs is provided with an iterator, the iterator indicates a first queue pair, and the method further comprises:
modifying the iterator of the first group of queue pairs to indicate a second queue pair in the first group of queue pairs in response to a failure in the first queue pair, wherein the second queue pair is different from the first queue pair; and
submitting, by the first thread, the first data to a second RDMA device corresponding to the second queue pair.

3. The method according to claim 2, wherein the first completion channel is a first completion queue corresponding to the first queue pair, the first thread is provided with a first list, the first list indicates a transmission state of each piece of data among the first data, and after detecting whether the first data exists in the first completion channel, the method further comprises:
updating, in response to the first portion of data among the first data existing in the first completion queue, the first list to indicate successful transmission of the first portion of data, wherein the first portion of data comprises at least one piece of data;
and submitting, by the first thread, the first data to the second RDMA device corresponding to the second queue pair comprises:
submitting, by the first thread, data other than the first portion of data among the first data to the second RDMA device based on the first list.

4. The method according to claim 2, wherein the iterator indicates the first queue pair, and the method further comprises:
acquiring a second allocation request for a queue pair from the first thread;
locking the first group of queue pairs for the first thread;
modifying the iterator of the first group of queue pairs to indicate a third queue pair, wherein the third queue pair is different from the first queue pair, the first thread submits second data to a third RDMA device corresponding to the third queue pair, and a third completion queue corresponds to the third queue pair;

detecting whether the second data exists in the third completion queue; and releasing the first group of queue pairs in response to the second data existing in the third completion queue.

5. The method according to claim 4, further comprising:

acquiring a third allocation request for a queue pair from a second thread;

locking the first group of queue pairs for the second thread;

modifying the iterator of the first group of queue pairs to indicate a fourth queue pair, wherein the fourth queue pair is different from the first queue pair, the second thread submits third data to a fourth RDMA device corresponding to the fourth queue pair, and a fourth completion queue corresponds to the fourth queue pair;

detecting whether the third data exists in the fourth completion queue; and releasing the first group of queue pairs in response to the fourth RDMA device having transmitted the third data.

6. The method according to claim 2, wherein the RDMA devices corresponding to each queue pair in the first group of queue pairs are different from each other.

7. The method according to claim 1, wherein the first channel is a first queue pair, the first queue pair comprises a transmission queue, the first completion channel is a first completion queue corresponding to the first queue pair, and the method further comprises:

detecting whether the first data exists in the transmission queue;

determining that an RDMA device corresponding to the first queue pair has received the first data in response to the first data existing in the transmission queue;

detecting whether a completion queue entity for the first data exists in the first completion queue in response to the first data not existing in the transmission queue; and determining that the first RDMA device has transmitted the first data in response to the completion queue entity for the first data existing in the first completion queue.

8. The method according to claim 7, further comprising:

detecting a transmission state of transmission data in the transmission queue;

re-transmitting the transmission data in response to transmission failure of the transmission data in the transmission queue; and constructing a completion queue entity for the transmission data in the first completion queue in response to a successful transmission of the transmission data.

9. The method according to claim 8, further comprising:

accessing the first completion queue;

retrieving a completion queue entity for each piece of data among the first data from the first completion queue;

determining that the first data has been transmitted in response to the completion queue entity for each piece of data being retrieved; and eliminating the completion queue entity for each piece of data from the first completion queue.

10. The method according to claim 9, further comprising:

repeatedly performing retrieval in the first completion queue in response to the failure to retrieve the completion queue entity for each piece of data.

11. An electronic device, comprising:

a processor; and a memory coupled to the processor and having instructions stored thereon, wherein the instructions, when executed by the processor, cause the electronic device to perform actions comprising:

acquiring a first allocation request for a channel from a first thread;

locking a first group of channels for the first thread, wherein a plurality of channels in the first group of channels correspond to a plurality of remote direct memory access (RDMA) devices, the first thread submits first data to a first RDMA device corresponding to a first channel in the first group of channels, and a first completion channel corresponds to the first channel;

detecting whether the first data exists in the first completion channel; and releasing the first group of channels in response to the first data existing in the first completion channel.

12. The electronic device according to claim 11, wherein the first group of channels is a first group of queue pairs, the first group of queue pairs is provided with an iterator, the iterator indicates a first queue pair, and the actions further comprise:

modifying the iterator of the first group of queue pairs to indicate a second queue pair in the first group of queue pairs in response to a failure in the first queue pair, wherein the second queue pair is different from the first queue pair; and submitting, by the first thread, the first data to a second RDMA device corresponding to the second queue pair.

13. The electronic device according to claim 12, wherein the first completion channel is a first completion queue corresponding to the first queue pair, the first thread is provided with a first list, the first list indicates a transmission state of each piece of data among the first data, and after detecting whether the first data exists in the first completion channel, the actions further comprise:

updating, in response to the first portion of data among the first data existing in the first completion queue, the first list to indicate successful transmission of the first portion of data, wherein the first portion of data comprises at least one piece of data;

and submitting, by the first thread, the first data to the second RDMA device corresponding to the second queue pair comprises:

submitting, by the first thread, data other than the first portion of data among the first data to the second RDMA device based on the first list.

14. The electronic device according to claim 12, wherein the iterator indicates the first queue pair, and the actions further comprise:

acquiring a second allocation request for a queue pair from the first thread;

locking the first group of queue pairs for the first thread;

modifying the iterator of the first group of queue pairs to indicate a third queue pair, wherein the third queue pair is different from the first queue pair, the first thread submits second data to a third RDMA device corresponding to the third queue pair, and a third completion queue corresponds to the third queue pair;

detecting whether the second data exists in the third completion queue; and releasing the first group of queue pairs in response to the second data existing in the third completion queue.

15. The electronic device according to claim 14, wherein the actions further comprise:

acquiring a third allocation request for a queue pair from a second thread;

locking the first group of queue pairs for the second thread;

modifying the iterator of the first group of queue pairs to indicate a fourth queue pair, wherein the fourth queue pair is different from the first queue pair, the second thread submits third data to a fourth RDMA device corresponding to the fourth queue pair, and a fourth completion queue corresponds to the fourth queue pair;

detecting whether the third data exists in the fourth completion queue; and releasing the first group of queue pairs in response to the fourth RDMA device having transmitted the third data.

16. The electronic device according to claim 12, wherein the RDMA devices corresponding to each queue pair in the first group of queue pairs are different from each other.

17. The electronic device according to claim 11, wherein the first channel is a first queue pair, the first queue pair comprises a transmission queue, the first completion channel is a first completion queue corresponding to the first queue pair, and the actions further comprise:

detecting whether the first data exists in the transmission queue;

determining that an RDMA device corresponding to the first queue pair has received the first data in response to the first data existing in the transmission queue;

detecting whether a completion queue entity for the first data exists in the first completion queue in response to the first data not existing in the transmission queue; and determining that the first RDMA device has transmitted the first data in response to the completion queue entity for the first data existing in the first completion queue.

18. The electronic device according to claim 17, wherein the actions further comprise:

detecting a transmission state of transmission data in the transmission queue;

re-transmitting the transmission data in response to transmission failure of the transmission data in the transmission queue; and constructing a completion queue entity for the transmission data in the first completion queue in response to a successful transmission of the transmission data.

19. The electronic device according to claim 18, wherein the actions further comprise:

accessing the first completion queue;

retrieving a completion queue entity for each piece of data among the first data from the first completion queue;

determining that the first data has been transmitted in response to the completion queue entity for each piece of data being retrieved; and eliminating the completion queue entity for each piece of data from the first completion queue.

20. A non-volatile memory having machine-executable instructions stored therein, wherein the machine-executable instructions, when executed by a processor, cause the processor to perform actions comprising:

acquiring a first allocation request for a channel from a first thread;

locking a first group of channels for the first thread, wherein a plurality of channels in the first group of channels correspond to a plurality of remote direct memory access (RDMA) devices, the first thread submits first data to a first RDMA device corresponding to a first channel in the first group of channels, and a first completion channel corresponds to the first channel;

detecting whether the first data exists in the first completion channel; and releasing the first group of channels in response to the first data existing in the first completion channel.

* * * * *